March 10, 1931.  C. A. PARSONS ET AL  1,795,795

POWER TRANSMISSION DEVICE

Filed Feb. 25, 1930

Inventors
Charles Algernon Parsons
Stanley Smith Cook and
Louis Mortimer Douglas
By their Attorneys
Philip Sawyer Rice Kennedy Patented Mar. 10, 1931

1,795,795

UNITED STATES PATENT OFFICE

CHARLES ALGERNON PARSONS, STANLEY SMITH COOK, AND LOUIS MORTIMER DOUGLAS, OF NEWCASTLE-ON-TYNE, ENGLAND; SAID COOK AND DOUGLAS ASSIGNORS TO SAID PARSONS

POWER-TRANSMISSION DEVICE

Application filed February 25, 1930, Serial No. 431,102, and in Great Britain February 11, 1929.

The invention relates to power-transmission devices of the kind in which power is transmitted from one shaft to another by gearing and though not restricted thereto is particularly applicable to installations in which a low-pressure turbine receives the exhaust from a reciprocating engine, the power developed by the turbine being transmitted by gearing to the shaft of the reciprocating engine.

In such an application, difficulties may be experienced due to want of alignment or wear of the bearings arising from deflection of the crankshaft, particularly in the vertical direction, caused by the pressure of the connecting rods on the cranks or from any other cause, with a resulting want of parallelism between the axes of the intermeshing gear wheels.

With a view to overcoming such difficulties, the present invention consists in the combination of elements hereinafter described and particularly pointed out in the claims.

Referring to the accompanying diagrammatic drawings:—

Figure 1:
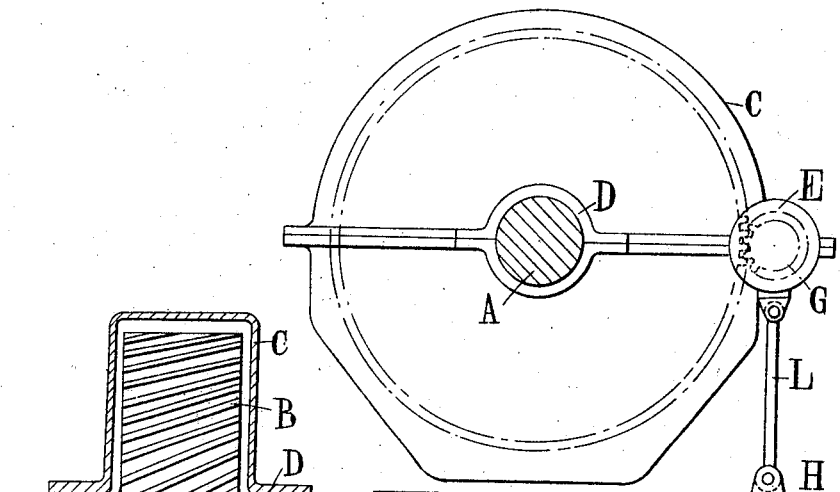
Figure 1 shows an end view of a construction in which the power is transmitted through single-reduction gearing, but with a link for preventing the bodily rotation of the gear casing, which construction of Figure 1 does not embody the present invention, but is included for purpose of illustration.
Figure 2:
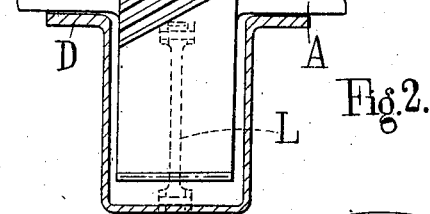
Figure 2 is a corresponding longitudinal view partly in section.

In the construction shown in Figures 1 and 2, the large gear wheel, B, of a single-reduction train is mounted on the low speed shaft, A, the casing, C, surrounding this gear wheel being provided with bearings, D, so that it rides freely on the same shaft. In addition, the casing carries in suitable bearings, E, the pinion, G, gearing with the large gear wheel, B, and mounted on the high-speed shaft.

The rotation of the casing C around the shaft A is shown as prevented by the link L between the casing C and the foundation H, and in line with the axis of pinion G.

With such an arrangement, if the bearings of the low-speed shaft wear, or the shaft deflects, the shaft, A, is or may be thrown slightly out of alignment but as the gear case C, is centered on the shaft itself and carries the pinion, G, the two gear wheels, B and G, continue to mesh correctly.

Figure 3:
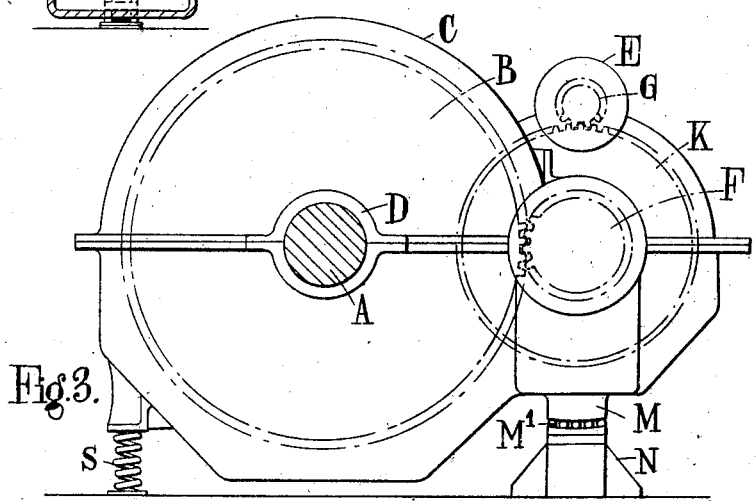
Figure 3 is a view similar to Figure 1, showing a double reduction gearing construction embodying the present invention.

Referring now to the improved means for preventing the rotation of the gear casing on the shaft and embodying the present invention, shown in Figure 3 as applied to a double-reduction gear, the gear case, C, as before, rides freely on the low speed shaft, A, and carries not only the bearings for the secondary pinion, F, gearing with the secondary wheel, B, on the low-speed shaft but also the primary pinion, G, mounted on the high-speed shaft and the primary wheel, K, mounted on the same shaft as the secondary pinion, F.

To prevent rotation of the gear case as a whole about the axis of the shaft, A, a bracket, M, or the like secured to the gear case and having a surface concentric with the axis of the secondary pinion, F, butts against a complementary surface, N, fixed to the foundation, with the interposition of rollers, $M^1$, or other anti-friction devices.

In this case, it will be seen that while the gear case is prevented from rotating in a clockwise direction (see Figure 3) about the axis of the shaft, A, it can move slightly in response to changes in position of the axis of the main line shaft.

It will be understood that the intermediate gears of Figure 3 may be omitted and the pinion F engaging the gear B be the primary pinion, as in Figure 1, if double reduction gearing is not required.

The weight of the gear case on its bearings may be relieved, for example, by compressed spring supports such as S, acting between brackets or other suitable abutments on the gear case and the foundation.

If desired, the springs may be adjusted to counteract partly or wholly the weight of the gear case.

Variations may be made from the specific constructional forms above described without exceeding the scope of the invention.

Having now described our invention, what we claim as new and desire to secure by Letters Patent is:—

1. In combination, a high-speed shaft, a low-speed shaft, means for gearing said shafts together including a pinion on said high-speed shaft, a frame freely mounted on and having bearings embracing said low-speed shaft and centering said frame thereon, bearings for said pinion carried by said frame, and means for preventing bodily rotational movement of said frame about the axis of said low-speed shaft while permitting a limited swinging movement of the frame on the axis of the pinion, said means for preventing bodily rotational movement of said frame comprising cooperating abutment members having coacting surfaces in line with the axis of the pinion and lying below the centre thereof, one of said abutment members being in rigid association with said frame and the other of said abutment members being fixed and bearings between said abutment members for permitting relative movement therebetween in the swinging movement of the frame.

2. The combination claimed in claim 1, with the addition of resilient means opposing said swinging movement and acting on said frame in a direction opposite to gravity.

3. In combination, a high-speed shaft, a low-speed shaft, a pinion mounted on said high-speed shaft, a gear wheel mounted on said low-speed shaft, intermediate gear wheels meshing respectively with said first-mentioned gear wheel and said pinion, the axes of said first-mentioned gear wheel and the intermediate gear wheel meshing therewith lying in about the same horizontal plane, a frame freely mounted on and having bearings embracing said low-speed shaft and centering said frame thereon, bearings for said pinion and said intermediate gear wheels carried by said frame, and means for preventing bodily rotational movement of said frame about said low-speed shaft while permitting a limited swinging movement of the frame on the axis of the intermediate gear wheel meshing with the gear wheel on the low-speed shaft, said means for preventing bodily rotational movement of said frame comprising co-operating abutment members concentric with the axis of said intermediate gear wheel and lying below the centre thereof, one of said abutment members being in rigid association with said frame and the other of said abutment members being fixed, and bearings between said abutment members for permitting relative movement therebetween.

In testimony whereof we have signed our names to this specification.

CHARLES ALGERNON PARSONS.
STANLEY SMITH COOK.
LOUIS MORTIMER DOUGLAS.